US012795133B2

(12) United States Patent
Xu et al.

(10) Patent No.: US 12,795,133 B2
(45) Date of Patent: Nov. 10, 2026

(54) METHOD, APPARATUS, AND MEDIUM FOR VIDEO PROCESSING

(71) Applicant: Bytedance Inc., Los Angeles, CA (US)

(72) Inventors: Jizheng Xu, Los Angeles, CA (US); Li Zhang, Los Angeles, CA (US)

(73) Assignee: BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 18/619,013

(22) Filed: Mar. 27, 2024

(65) Prior Publication Data

US 2024/0244241 A1 Jul. 18, 2024

Related U.S. Application Data

(63) Continuation of application No. PCT/US2022/077087, filed on Sep. 27, 2022.

(60) Provisional application No. 63/248,845, filed on Sep. 27, 2021.

(51) Int. Cl.

| | |
|---|---|
| ***H04N 19/423*** | (2014.01) |
| ***H04N 19/159*** | (2014.01) |
| ***H04N 19/176*** | (2014.01) |
| ***H04N 19/593*** | (2014.01) |
| ***H04N 19/82*** | (2014.01) |
| ***H04N 19/91*** | (2014.01) |

(52) U.S. Cl.

CPC ......... *H04N 19/423* (2014.11); *H04N 19/159* (2014.11); *H04N 19/176* (2014.11); *H04N 19/593* (2014.11); *H04N 19/82* (2014.11); *H04N 19/91* (2014.11)

(58) Field of Classification Search

CPC ...... H04N 19/105; H04N 19/11; H04N 19/13; H04N 19/159; H04N 19/176; H04N 19/423; H04N 19/436; H04N 19/463; H04N 19/593; H04N 19/82; H04N 19/91

See application file for complete search history.

(56) References Cited

U.S. PATENT DOCUMENTS

| | | | | |
|---|---|---|---|---|
| 10,986,349 | B2 | 4/2021 | Zhou et al. | |
| 11,677,976 | B2 * | 6/2023 | Leleannec ............ | H04N 19/182 375/240.15 |
| 2004/0264569 | A1 * | 12/2004 | Mpr ..................... | H04N 19/427 375/E7.096 |
| 2015/0264386 | A1 * | 9/2015 | Pang .................... | H04N 19/463 375/240.16 |

(Continued)

OTHER PUBLICATIONS

International Search Report received for PCT Patent Application No. PCT/US2022/077087, mailed on Dec. 28, 2022, 3 pages.

*Primary Examiner* — Md N Haque

(74) *Attorney, Agent, or Firm* — Astute IP Law Group

(57) ABSTRACT

Embodiments of the present disclosure provide a solution for video processing. A method for video processing is proposed. The method comprises determining, during a conversion between a target video block of a video and a bitstream of the video, a prediction of the target video block from a buffer set. The target video block is coded with intra block copy (IBC) mode. The method further comprises performing the conversion based on the prediction. Compared with the conventional solution, the proposed method can advantageously improve the IBC buffer design and thus improve the coding effectiveness and coding efficiency.

19 Claims, 5 Drawing Sheets

(56) References Cited

U.S. PATENT DOCUMENTS

| | | | | |
|---|---|---|---|---|
| 2016/0105670 | A1* | 4/2016 | Pang | H04N 19/70 375/240.16 |
| 2017/0034526 | A1* | 2/2017 | Rapaka | H04N 19/127 |
| 2019/0246143 | A1* | 8/2019 | Zhang | H04N 19/132 |
| 2020/0099926 | A1* | 3/2020 | Tanner | H04N 19/97 |
| 2020/0154100 | A1* | 5/2020 | Zhao | H04N 19/105 |
| 2021/0227206 | A1* | 7/2021 | Chiu | H04N 19/70 |
| 2021/0235095 | A1* | 7/2021 | Choi | H04N 19/157 |
| 2021/0297657 | A1 | 9/2021 | Lee | |

* cited by examiner

METHOD, APPARATUS, AND MEDIUM FOR VIDEO PROCESSING

CROSS-REFERENCE TO RELATED APPLICATIONS

This application is a continuation of International Application No. PCT/US2022/077087, filed on Sep. 27, 2022, which claims the benefit of the U.S. Provisional Application No. 63/248,845, filed on Sep. 27, 2021. The entire contents of these applications are hereby incorporated by reference in their entireties.

FIELD

Embodiments of the present disclosure relates generally to video coding techniques, and more particularly, to intra block copy (IBC) buffer design.

BACKGROUND

In nowadays, digital video capabilities are being applied in various aspects of peoples' lives. Multiple types of video compression technologies, such as MPEG-2, MPEG-4, ITU-TH.263, ITU-TH.264/MPEG-4 Part 10 Advanced Video Coding (AVC), ITU-TH.265 high efficiency video coding (HEVC) standard, versatile video coding (VVC) standard, have been proposed for video encoding/decoding. However, coding efficiency of conventional video coding techniques is generally very low, which is undesirable.

SUMMARY

Embodiments of the present disclosure provide a solution for video processing.

In a first aspect, a method for video processing is proposed. The method comprises: determining, during a conversion between a target video block of a video and a bitstream of the video, a prediction of the target video block from a buffer set, the target video block being coded with intra block copy (IBC) mode; and performing the conversion based on the prediction.

The method in accordance with the first aspect of the present disclosure determines the prediction of the target video block from a buffer set. Compared with the conventional solution where one buffer is used to determine the prediction, the proposed method can advantageously achieve an improved buffer design, and thus improve the coding effectiveness and coding efficiency.

In a second aspect, an apparatus for processing video data is proposed. The apparatus for processing video data comprises a processor and a non-transitory memory with instructions thereon, wherein the instructions upon execution by the processor, cause the processor to perform a method in accordance with the first aspect of the present disclosure.

In a third aspect, a non-transitory computer-readable storage medium is proposed. The non-transitory computer-readable storage medium stores instructions that cause a processor to perform a method in accordance with the first aspect of the present disclosure.

In a fourth aspect, another non-transitory computer-readable recording medium is proposed. The non-transitory computer-readable recording medium stores a bitstream of a video which is generated by a method performed by a video processing apparatus, wherein the method comprises: determining a prediction of a target video block of the video from a buffer set, the target video block being coded with intra block copy (IBC) mode; and generating the bitstream based on the prediction.

In a fifth aspect, a method for storing a bitstream of a video is proposed. The method comprises: determining a prediction of a target video block of the video from a buffer set, the target video block being coded with intra block copy (IBC) mode; generating the bitstream based on the prediction; and storing the bitstream in a non-transitory computer-readable recording medium.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

Throughout the drawings, the same or similar reference numerals usually refer to the same or similar elements.

DETAILED DESCRIPTION

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Example Environment

Figure 1:
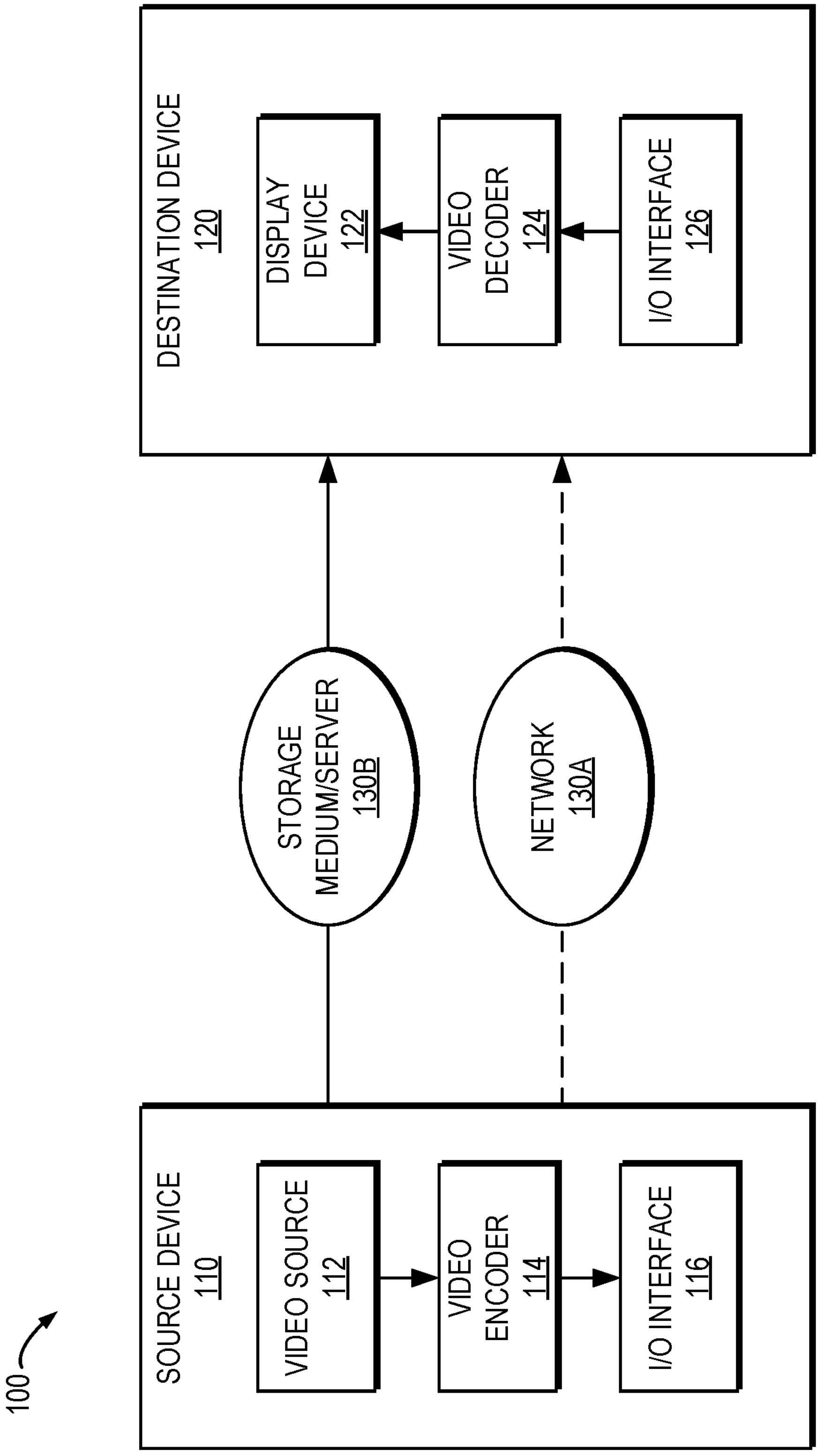
FIG. 1 illustrates a block diagram that illustrates an example video coding system, in accordance with some embodiments of the present disclosure.

FIG. 1 is a block diagram that illustrates an example video coding system 100 that may utilize the techniques of this disclosure. As shown, the video coding system 100 may include a source device 110 and a destination device 120. The source device 110 can be also referred to as a video encoding device, and the destination device 120 can be also referred to as a video decoding device. In operation, the source device 110 can be configured to generate encoded video data and the destination device 120 can be configured to decode the encoded video data generated by the source device 110. The source device 110 may include a video source 112, a video encoder 114, and an input/output (I/O) interface 116.

The video source 112 may include a source such as a video capture device. Examples of the video capture device include, but are not limited to, an interface to receive video data from a video content provider, a computer graphics system for generating video data, and/or a combination thereof.

The video data may comprise one or more pictures. The video encoder 114 encodes the video data from the video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. The I/O interface 116 may include a modulator/demodulator and/or a transmitter. The encoded video data may be transmitted directly to destination device 120 via the I/O interface 116 through the network 130A. The encoded video data may also be stored onto a storage medium/server 130B for access by destination device 120.

The destination device 120 may include an I/O interface 126, a video decoder 124, and a display device 122. The I/O interface 126 may include a receiver and/or a modem. The I/O interface 126 may acquire encoded video data from the source device 110 or the storage medium/server 130B. The video decoder 124 may decode the encoded video data. The display device 122 may display the decoded video data to a user. The display device 122 may be integrated with the destination device 120, or may be external to the destination device 120 which is configured to interface with an external display device.

The video encoder 114 and the video decoder 124 may operate according to a video compression standard, such as the High Efficiency Video Coding (HEVC) standard, Versatile Video Coding (VVC) standard and other current and/or further standards.

Figure 2:
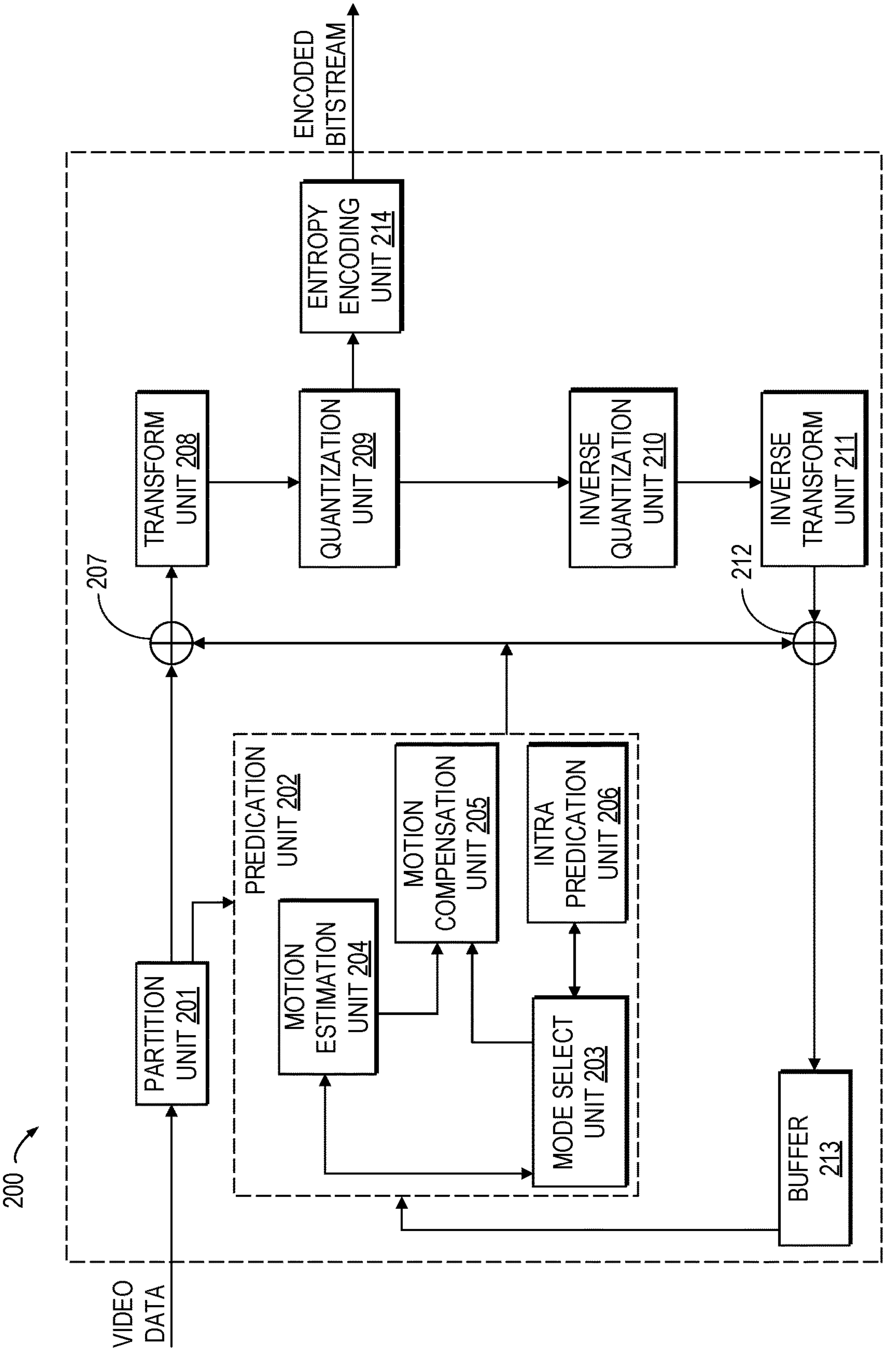
FIG. 2 illustrates a block diagram that illustrates a first example video encoder, in accordance with some embodiments of the present disclosure.

FIG. 2 is a block diagram illustrating an example of a video encoder 200, which may be an example of the video encoder 114 in the system 100 illustrated in FIG. 1, in accordance with some embodiments of the present disclosure.

The video encoder 200 may be configured to implement any or all of the techniques of this disclosure. In the example of FIG. 2, the video encoder 200 includes a plurality of functional components. The techniques described in this disclosure may be shared among the various components of the video encoder 200. In some examples, a processor may be configured to perform any or all of the techniques described in this disclosure.

In some embodiments, the video encoder 200 may include a partition unit 201, a predication unit 202 which may include a mode select unit 203, a motion estimation unit 204, a motion compensation unit 205 and an intra-prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, the video encoder 200 may include more, fewer, or different functional components. In an example, the predication unit 202 may include an intra block copy (IBC) unit. The IBC unit may perform predication in an IBC mode in which at least one reference picture is a picture where the current video block is located.

Furthermore, although some components, such as the motion estimation unit 204 and the motion compensation unit 205, may be integrated, but are represented in the example of FIG. 2 separately for purposes of explanation.

The partition unit 201 may partition a picture into one or more video blocks. The video encoder 200 and the video decoder 300 may support various video block sizes.

The mode select unit 203 may select one of the coding modes, intra or inter, e.g., based on error results, and provide the resulting intra-coded or inter-coded block to a residual generation unit 207 to generate residual block data and to a reconstruction unit 212 to reconstruct the encoded block for use as a reference picture. In some examples, the mode select unit 203 may select a combination of intra and inter predication (CIIP) mode in which the predication is based on an inter predication signal and an intra predication signal. The mode select unit 203 may also select a resolution for a motion vector (e.g., a sub-pixel or integer pixel precision) for the block in the case of inter-predication.

To perform inter prediction on a current video block, the motion estimation unit 204 may generate motion information for the current video block by comparing one or more reference frames from buffer 213 to the current video block. The motion compensation unit 205 may determine a predicted video block for the current video block based on the motion information and decoded samples of pictures from the buffer 213 other than the picture associated with the current video block.

The motion estimation unit 204 and the motion compensation unit 205 may perform different operations for a current video block, for example, depending on whether the current video block is in an I-slice, a P-slice, or a B-slice. As used herein, an "I-slice" may refer to a portion of a picture composed of macroblocks, all of which are based upon macroblocks within the same picture. Further, as used herein, in some aspects, "P-slices" and "B-slices" may refer to portions of a picture composed of macroblocks that are not dependent on macroblocks in the same picture.

In some examples, the motion estimation unit 204 may perform uni-directional prediction for the current video block, and the motion estimation unit 204 may search reference pictures of list 0 or list 1 for a reference video block for the current video block. The motion estimation unit 204 may then generate a reference index that indicates the reference picture in list 0 or list 1 that contains the reference video block and a motion vector that indicates a spatial displacement between the current video block and the reference video block. The motion estimation unit 204 may output the reference index, a prediction direction indicator, and the motion vector as the motion information of the current video block. The motion compensation unit 205 may generate the predicted video block of the current video block based on the reference video block indicated by the motion information of the current video block.

Alternatively, in other examples, the motion estimation unit 204 may perform bi-directional prediction for the current video block. The motion estimation unit 204 may search the reference pictures in list 0 for a reference video block for the current video block and may also search the reference pictures in list 1 for another reference video block for the current video block. The motion estimation unit 204 may then generate reference indexes that indicate the reference pictures in list 0 and list 1 containing the reference video blocks and motion vectors that indicate spatial displacements between the reference video blocks and the current video block. The motion estimation unit 204 may output the reference indexes and the motion vectors of the current video block as the motion information of the current video block. The motion compensation unit 205 may generate the predicted video block of the current video block based on the reference video blocks indicated by the motion information of the current video block.

In some examples, the motion estimation unit 204 may output a full set of motion information for decoding processing of a decoder. Alternatively, in some embodiments, the motion estimation unit 204 may signal the motion information of the current video block with reference to the motion information of another video block. For example, the motion estimation unit 204 may determine that the motion information of the current video block is sufficiently similar to the motion information of a neighboring video block.

In one example, the motion estimation unit 204 may indicate, in a syntax structure associated with the current video block, a value that indicates to the video decoder 300 that the current video block has the same motion information as the another video block.

In another example, the motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

The intra prediction unit 206 may perform intra prediction on the current video block. When the intra prediction unit 206 performs intra prediction on the current video block, the intra prediction unit 206 may generate prediction data for the current video block based on decoded samples of other video blocks in the same picture. The prediction data for the current video block may include a predicted video block and various syntax elements.

The residual generation unit 207 may generate residual data for the current video block by subtracting (e.g., indicated by the minus sign) the predicted video block (s) of the current video block from the current video block. The residual data of the current video block may include residual video blocks that correspond to different sample components of the samples in the current video block.

In other examples, there may be no residual data for the current video block for the current video block, for example in a skip mode, and the residual generation unit 207 may not perform the subtracting operation.

The transform processing unit 208 may generate one or more transform coefficient video blocks for the current video block by applying one or more transforms to a residual video block associated with the current video block.

After the transform processing unit 208 generates a transform coefficient video block associated with the current video block, the quantization unit 209 may quantize the transform coefficient video block associated with the current video block based on one or more quantization parameter (QP) values associated with the current video block.

The inverse quantization unit 210 and the inverse transform unit 211 may apply inverse quantization and inverse transforms to the transform coefficient video block, respectively, to reconstruct a residual video block from the transform coefficient video block. The reconstruction unit 212 may add the reconstructed residual video block to corresponding samples from one or more predicted video blocks generated by the predication unit 202 to produce a reconstructed video block associated with the current video block for storage in the buffer 213.

After the reconstruction unit 212 reconstructs the video block, loop filtering operation may be performed to reduce video blocking artifacts in the video block.

The entropy encoding unit 214 may receive data from other functional components of the video encoder 200. When the entropy encoding unit 214 receives the data, the entropy encoding unit 214 may perform one or more entropy encoding operations to generate entropy encoded data and output a bitstream that includes the entropy encoded data.

Figure 3:
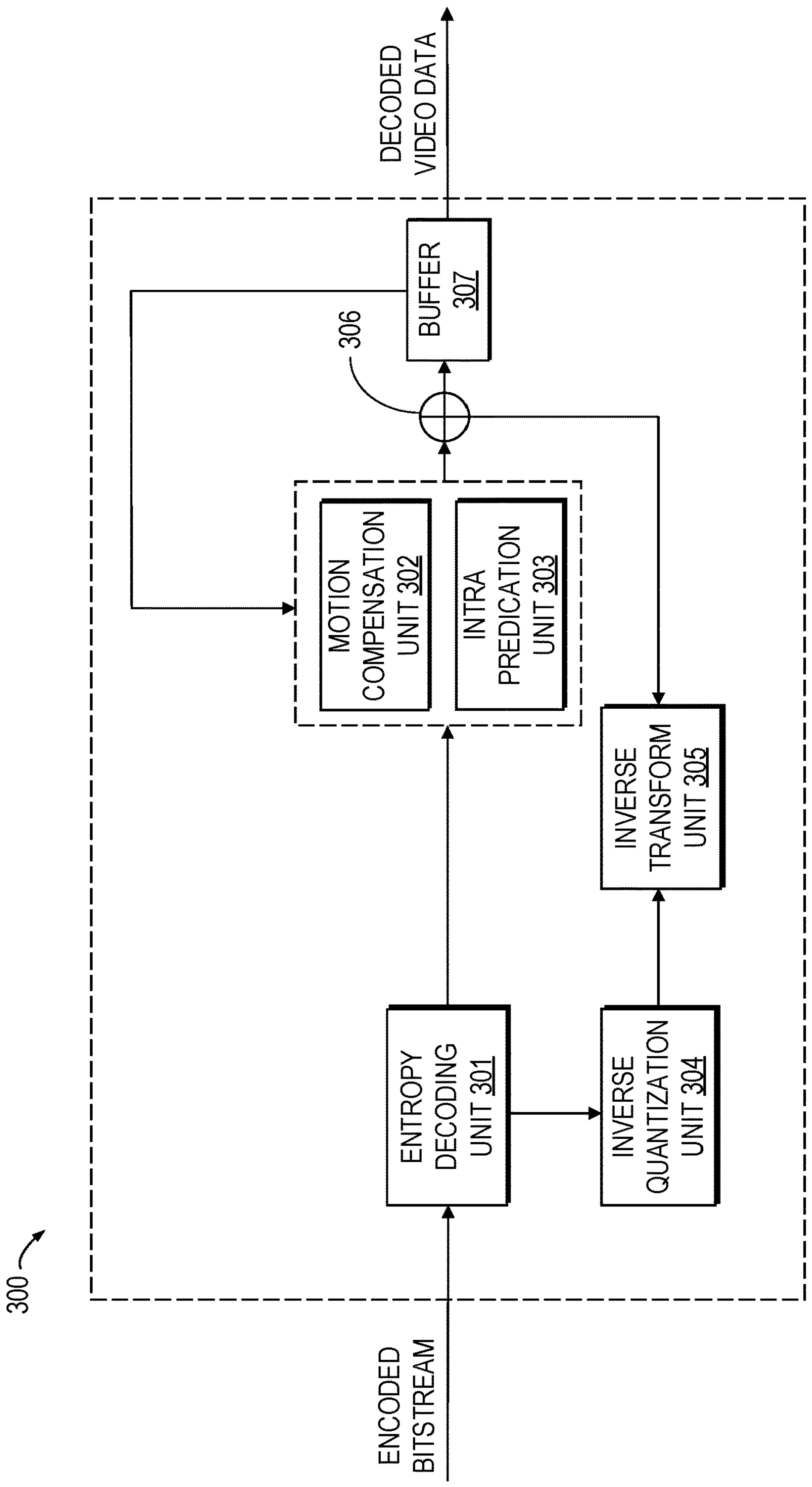
FIG. 3 illustrates a block diagram that illustrates an example video decoder, in accordance with some embodiments of the present disclosure.

FIG. 3 is a block diagram illustrating an example of a video decoder 300, which may be an example of the video decoder 124 in the system 100 illustrated in FIG. 1, in accordance with some embodiments of the present disclosure.

The video decoder 300 may be configured to perform any or all of the techniques of this disclosure. In the example of FIG. 3, the video decoder 300 includes a plurality of functional components. The techniques described in this disclosure may be shared among the various components of the video decoder 300. In some examples, a processor may be configured to perform any or all of the techniques described in this disclosure.

In the example of FIG. 3, the video decoder 300 includes an entropy decoding unit 301, a motion compensation unit 302, an intra prediction unit 303, an inverse quantization unit 304, an inverse transformation unit 305, and a reconstruction unit 306 and a buffer 307. The video decoder 300 may, in some examples, perform a decoding pass generally reciprocal to the encoding pass described with respect to video encoder 200.

The entropy decoding unit 301 may retrieve an encoded bitstream. The encoded bitstream may include entropy coded video data (e.g., encoded blocks of video data). The entropy decoding unit 301 may decode the entropy coded video data, and from the entropy decoded video data, the motion compensation unit 302 may determine motion information including motion vectors, motion vector precision, reference picture list indexes, and other motion information. The motion compensation unit 302 may, for example, determine such information by performing the AMVP and merge mode. AMVP is used, including derivation of several most probable candidates based on data from adjacent PBs and the reference picture. Motion information typically includes the horizontal and vertical motion vector displacement values, one or two reference picture indices, and, in the case of prediction regions in B slices, an identification of which reference picture list is associated with each index. As used herein, in some aspects, a "merge mode" may refer to deriving the motion information from spatially or temporally neighboring blocks.

The motion compensation unit 302 may produce motion compensated blocks, possibly performing interpolation based on interpolation filters. Identifiers for interpolation filters to be used with sub-pixel precision may be included in the syntax elements.

The motion compensation unit 302 may use the interpolation filters as used by the video encoder 200 during encoding of the video block to calculate interpolated values for sub-integer pixels of a reference block. The motion compensation unit 302 may determine the interpolation filters used by the video encoder 200 according to the received syntax information and use the interpolation filters to produce predictive blocks.

The motion compensation unit 302 may use at least part of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence. As used herein, in some aspects, a "slice" may refer to a data structure that can be decoded independently from other slices of the same picture, in terms of entropy coding, signal prediction, and residual signal reconstruction. A slice can either be an entire picture or a region of a picture.

The intra prediction unit 303 may use intra prediction modes for example received in the bitstream to form a prediction block from spatially adjacent blocks. The inverse quantization unit 304 inverse quantizes, i.e., de-quantizes, the quantized video block coefficients provided in the bitstream and decoded by entropy decoding unit 301. The inverse transform unit 305 applies an inverse transform.

The reconstruction unit 306 may obtain the decoded blocks, e.g., by summing the residual blocks with the corresponding prediction blocks generated by the motion compensation unit 302 or intra-prediction unit 303. If desired, a deblocking filter may also be applied to filter the decoded blocks in order to remove blockiness artifacts. The decoded video blocks are then stored in the buffer 307, which provides reference blocks for subsequent motion compensation/intra predication and also produces decoded video for presentation on a display device.

Some exemplary embodiments of the present disclosure will be described in detailed hereinafter. It should be understood that section headings are used in the present document to facilitate ease of understanding and do not limit the embodiments disclosed in a section to only that section. Furthermore, while certain embodiments are described with reference to Versatile Video Coding or other specific video codecs, the disclosed techniques are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

1. Summary

This disclosure is related to video coding technologies. Specifically, it is related to intra block copy in video coding. It may be applied to the standard under development or planning, e.g. next generation video coding standards beyond the Versatile Video Coding standard. It may be also applicable to future video coding standards or video codec.

2. Background

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC), H.265/HEVC and the latest H.266/Versatile Video Coding (VVC) standards. Since H.261, the video coding standards are based on the hybrid video coding structure wherein temporal prediction plus transform coding are utilized. To explore the future video coding technologies beyond VVC, Joint Video Exploration Team (JVET) started development of the Enhanced Compression Model in April 2021. Since then, many new methods have been adopted by JVET and put into the reference software.

2.1 Virtual Pipeline Data Unit

Virtual pipeline data units (VPDUs) are defined as non-overlapping M×M-luma(L)/N×N-chroma(C) units in a picture. In hardware decoders, successive VPDUs are processed by multiple pipeline stages at the same time; different stages process different VPDUs simultaneously. The VPDU size is roughly proportional to the buffer size in most pipeline stages, so it is very important to keep the VPDU size small. In HEVC hardware decoders, the VPDU size is set to maximum transform block (TB) size. In VVC, the VPDU size is increased to 64×64-luma/32×32-chroma for 4:2:0 format.

2.2 Intra Block Copy in VVC

To support Intra Block Copy (IBC) in VVC, a virtual buffer concept is used for reference buffer management. Given the CTU size, i.e., CtbSizeY, the buffer width in luma sample is defined as:

$$IbcBufWidthY = 256 * 128 / CtbSizeY$$

The corresponding chroma IBC buffer is defined as:

$$IbcBufWidthC = IbcBufWidthY / SubWidthC,$$

where SubWidthC depends on chroma format, which is defined in the following Table 1.

TABLE 1

SubWidthC and SubHeightC values derived from sps_chroma_format_idc

| sps_chroma_format_idc | Chroma format | SubWidthC | SubHeightC |
|---|---|---|---|
| 0 | Monochrome | 1 | 1 |
| 1 | 4:2:0 | 2 | 2 |
| 2 | 4:2:2 | 2 | 1 |
| 3 | 4:4:4 | 1 | 1 |

The height of the buffer in luma sample is CtbSizeY.

In VVC, a VPDU concept is applied to enable parallel decoding among different VPDUs within a CTU to increase the decoding throughput. Its size can be derived from CTU size, as in the following Table 2.

TABLE 2

VPDU size derived from CTU size in VVC

| CTU size | VPDU size |
|---|---|
| 128 × 128 | 64 × 64 |
| 64 × 64 | 64 × 64 |
| 32 × 32 | 32 × 32 |

VVC only supports CTU size being 32×32, 64×64 and 128×128. At the beginning of decoding a CTU row in a slice, the luma IBC buffer is reset to be −1. Before decoding a new VPDU, the luma buffer corresponding to that VPDU is also reset to be −1. After finishing decoding a VPDU's data prior to loop filtering, the corresponding buffer samples are updated to the VPDU data that have been just reconstructed.

After a CU has been reconstructed, the reconstructed samples before loop-filtering are stored in the IBC buffer as follows:

The following assignments are made for i=0 . . . nCurrSw−1, j=0 . . . nCurrSh−1:

$$xVb = (xCurr + i) \% ((cIdx == 0)\ ?\ IbcBufWidthY : IbcBufWidthC) \quad (1197)$$

$$yVb = (yCurr + j) \% ((cIdx == 0)\ ?\ CtbSizeY : (CtbSizeY / subHeightC)) \quad (1198)$$

$$IbcVirBuf[cIdx][xVb][yVb] = recSamples[xCurr + i][yCurr + j] \quad (1199)$$

If a CU uses IBC mode, its prediction is formed as follows:

When cIdx is equal to 0, for x=xCb . . . xCb+cbWidth−1 and y=yCb . . . yCb+cbHeight−1, the following applies:

$$xVb = (x + (bv[0] >> 4))\ \&\ (IbcBufWidthY - 1) \quad (1096)$$

$$yVb = (y + (bv[1] >> 4))\ \&\ (CtbSizeY - 1) \quad (1097)$$

-continued $$predSamples[x - xCb][y - yCb] = IbcVirBuf[0][xVb][yVb] \quad (1098)$$

When cIdx is not equal to 0, for x=xCb/SubWidthC . . . xCb/SubWidthC+cbWidth/SubWidthC−1 and y=yCb/SubHeightC . . . yCb/SubHeightC+cbHeight/SubHeightC−1, the following applies:

$$xVb = (x + (bv[0] >> (3 + SubWidthC)))\ \&\ (IbcBufWidthC - 1) \quad (1099)$$

$$yVb = (y + (bv[1] >> (3 + SubHeightC)))\ \&\ ((CtbSizeY / subHeightC) - 1) \quad (1100)$$

$$predSamples[x - (xCb / SubWidthC)][y - (yCb / SubHeightC)] = IbcVirBuf[cIdx][xVb][yVb] \quad (1101)$$

2.3 Enhanced Compression Model

After finishing the 1st version of VVC, JVET started to develop a test model to explore further coding efficiency improvement over VVC. The test model is named Enhanced Compression Model. Many new coding tools, e.g. intra temporal matching, dependent quantization with 8-states, are integrated into the VVC test model to improve the coding efficiency.

It is noted that in ECM, the CTU size can be extended to 256×256. However, the IBC buffer with the extended CTU size and corresponding processing are undefined.

2.4 General Virtual Buffer

Several disclosed bullets are about CTU size being 256×256. They are listed as follows:

11. When CTU/CTB size is 256×256, the corresponding IBC virtual buffer may be of size 64×256 to track availability of reference samples, i.e. ibcBufW=64, ibcBufH=256.
    a. In one example, before decoding a VPDU with top-left position (x0, y0), the corresponding VPDU row (0, y0%256) in the IBC buffer will be set to −1.
12. When CTU/CTB size is 256×256, the corresponding IBC virtual buffer may be of size 128×256 to track availability of reference samples, i.e. ibcBufW=128, ibcBufH=256.
    a. In one example, only one VPDU may be kept (excluding the current VPDU) for each VPDU row in the buffer except for a certain VPDU row.
        i. In one example, only one VPDU may be kept (excluding the current VPDU) for each VPDU row in the buffer except for the last VPDU row.

This document present more systematic and general design to handle large CTU.

2.5 IBC Buffer for Large CTU and VPDU

In a previous IDF, various methods to support CTU size larger than 128×128 and VPDU size larger than 64×64 are presented.

3. Potential Problems

In the current design of IBC buffer design, there are some issues and improvement to alleviate those is possible.

1) The current IBC buffer design can only use local samples during prediction and non-local prediction is not supported.

2) The current IBC buffer design does not support prediction from multiple non-connected reference area.

4. Detailed Descriptions

To solve the above problems, methods as summarized below are disclosed. The embodiments should be considered as examples to explain the general concepts and should not be interpreted in a narrow way. Furthermore, these embodiments can be applied individually or combined in any manner.

The term 'video block' may represent a row of coding tree blocks, a coding tree block (CTB), a coding tree unit (CTU), a coding block (CB), a CU, a PU, a TU, a PB, a TB or a video processing unit comprising multiple samples/pixels. A block may be rectangular or non-rectangular.

1) For a current video block coded with IBC mode, its prediction may be formed from a buffer set.
   a. In one example, a buffer set may consist of two or more buffers.
      i. In one example, a buffer set may consist of two or more buffers with the same width and height.
         1. In one example, a buffer set may consist of two buffers. Both are of the same size of a CTU.
         2. In one example, a buffer set may consist of two buffers. Both are of the same size of a VPDU.
      ii. Alternatively, a buffer set may contain two or more buffer with different widths and/or heights.
         1. In one example, a buffer set may consist of two buffers. One is of the same size of a CTU and the other one is of the same size of a VPDU.
      iii. In one example, one buffer may contain samples that are not connected to any samples of the current video processing unit (for example, CTU or VPDU or CU or PU) containing current video block.
      iv. In one example, one buffer may contain samples that are not connected to any samples stored in other buffers.
   b. In one example, the prediction may be formed solely from one buffer.
      i. Alternatively, furthermore, which buffer to be utilized may be further signalled or derived on-the-fly.
   c. In one example, the prediction may be formed from two or more buffers.
      i. In one example, one part of the prediction is from one buffer and another part of the prediction is from another buffer.
      ii. In one example, the prediction may be formed by fusion of predictions generated from different buffers.
         1. The fusion method may be average.
         2. The fusion method may be average after a clipping.
         3. The fusion method may be average before a clipping.
         4. The fusion method may be selecting different samples from different buffers.
   d. In one example, the two or more buffers in the buffer set may come from the same slice/tile/subpicture.
      i. Alternatively, the two or more buffers in the buffer set may come from different slice/tile/subpictures.
2) After the reconstruction of a video block, its reconstructed samples, before or after the loop filters, may be stored in one buffer of the buffer set.
   a. In one example, which buffer to store the reconstructed samples may be signalled or derived on-the-fly.
   b. In one example, which buffer to store the reconstructed samples may be indicated by a buffer index.
      i. Alternatively, furthermore, and the exact location in the buffer to store the reconstructed samples may be indicated by an offset vector, e.g. (BVx, BVy).
      ii. In one example, the buffer index is coded using context-based arithmetic coding.
         1. In one example, when the buffer set has two buffers, one bin may be signalled to indicate which buffer is used to store the reconstructed samples of the current video coding unit.
         2. In one example, each bin of the coded index may have only its own context.
         3. In one example, the context may consider the current video coding unit's left neighbor and above neighbor.
      iii. Alternatively, the buffer index may be inferred by some features of the current video coding unit.
         1. In one example, the features may include how many sub-units/samples uses IBC.
         2. In one example, the features may include how many sub-units/samples uses palette mode.
3) Every buffer may be reset to be a certain value, which may or may not be a valid pixel value, before or after decoding a video block (for example, picture, slice, tile, CTU row, CTU, VPDU, CU or PU).
   a. In one example, before decoding a picture/tile/slice, all buffers in the buffer set is reset to be a given value.
      i. In one example, the value is −1.
   b. In one example, after decoding a video coding unit (for example, a CTU or VPDU or CU or PU), an rectangular area in a buffer corresponding to the current unit may be reset to be a given value.
      i. In one example, the correspondence may depend on both the buffer index and the location of the unit.
         1. In one example, the value is −1.
   c. Alternatively, some buffers may be reset to be a certain value while some others may be not.
4) It may be a bitstream and/or conformance constraint that the combination of a buffer index and an offset vector shall be valid.
   a. The validaty of the combination of a buffer index and an offset vector may be determinated by whether the prediction formed with the buffer index and offset vector contains invalid pixel value or not.

The embodiments of the present disclosure are related to IBC buffer design. As used herein, the term "video block" may refer to a row of coding tree blocks, a coding tree block (CTB), a coding tree unit (CTU), a coding block (CB), a CU, a PU, a TU, a PB, a TB or a video processing unit comprising multiple samples/pixels. A block may be rectangular or non-rectangular.

Figure 4:
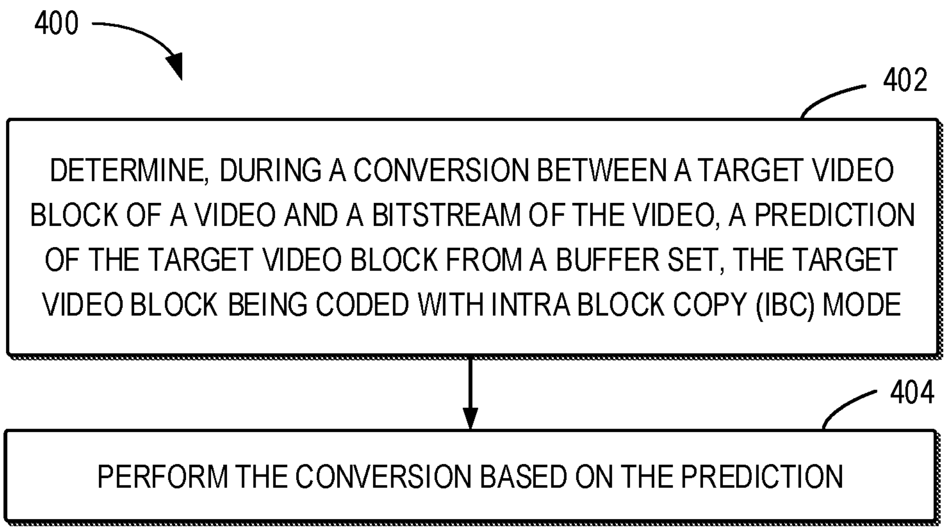
FIG. 4 illustrates a flowchart of a method for video processing in accordance with some embodiments of the present disclosure.

FIG. 4 illustrates a flowchart of a method 400 for video processing in accordance with some embodiments of the present disclosure. The method 400 may be implemented during a conversion between a target video block of a video and a bitstream of the video. As shown in FIG. 4, the method 400 starts at block 402, where a prediction of the target video block is determined from a buffer set. The target video block is coded with intra block copy (IBC) mode. In the IBC mode, prediction samples are derived from blocks of sample values of a same video region as determined by block vectors. As used herein, the target video block may also be referred to as "the current video block". By determining the prediction from the buffer set instead from one buffer, the IBC buffer design is improved. In this way, the prediction may be improved, thus improve the coding effectiveness and coding efficiency.

At block 404, the conversion is performed based on the prediction. In some embodiments, the conversion may include encoding the target video block into the bitstream. Alternatively, the conversion may include decoding the target video block from the bitstream.

In some embodiments, the buffer set comprises at least two buffers. In other words, the buffer set may consist of two or more buffers.

In some embodiments, a first size of a first buffer in the buffer set is same with a second size of a second buffer in the buffer set. For example, the first size may comprise a first height and a first width. That is, the buffer set may consist of two buffers with the same width and height.

In some embodiments, the first size comprises a size of a coding tree unit (CTU). Alternatively, in some embodiments, the first size comprises a size of a virtual pipeline data unit (VPDU). For example, the buffer set may consist of two buffers. Both of these two buffers may be of the same size of a CTU or the same size of a VPDU.

Alternatively, or in addition, in some embodiments, a first size of a first buffer in the buffer set is different from a second size of a second buffer in the buffer set. That is, the buffer set may contain two or more buffer with different widths and/or heights. For example, a first height of the first buffer may be different from a second height of the second buffer. For another example, a first width of the first buffer may be different from a second width of the second buffer.

In some embodiments, the first size comprises a size of a coding tree unit (CTU), and the second size comprises a size of a virtual pipeline data unit (VPDU). In other words, the buffer set may consist of two buffers. One if of the same size of a CTU and the other one is of the same size of a VPDU.

In some embodiments, a first sample in a first buffer in the buffer set is unconnected to a second sample in a video processing unit comprising the target video block. The video processing unit may comprise one of the following: a coding tree unit (CTU), a virtual pipeline data unit (VPDU), a coding unit (CU), or a prediction unit (PU). That is, one buffer may contain samples that are not connected to any samples of the current video processing unit containing the current video block. It is to be understood that these example video processing units are only for the purpose of illustration, without suggesting any limitation.

In some embodiments, a first sample in a first buffer in the buffer set is unconnected to a third sample in a second buffer in the buffer set. That is, one buffer may contain samples that are not connected to any samples stored in other buffers.

By using samples in the buffer unconnected to other samples in the current video processing unit or in other buffers, the proposed IBC buffer design can not only use local samples during prediction but also support non-local prediction. In addition, the proposed IBC buffer design can also support prediction from multiple non-connected reference area.

In some embodiments, at block 402, the prediction is determined by using at least one buffer in the buffer set. For example, the prediction may be formed from one buffer in the buffer set. Alternatively, the prediction may be formed from two or more buffers in the buffer set.

In some embodiments, information regarding a selection of the at least one buffer from the buffer set may be indicated in the bitstream. Alternatively, or in addition, in some embodiments, the information regarding the selection of the at least one buffer from the buffer set may be determined on-the-fly. In other words, which buffer to be utilized may be further signaled or derived on-the-fly.

In some embodiments, at block 402, a first portion of the prediction may be determined from a first buffer in the buffer set. A second portion of the prediction may be determined from a second buffer different from the first buffer in the buffer set. The prediction may be determined based on the first and second portions of the prediction. In other words, one part of the prediction is from one buffer and another part of the prediction is from another buffer.

In some embodiments, at block 402, a first prediction may be determined from a first buffer in the buffer set. A second prediction may be determined from a second buffer different from the first buffer in the buffer set. A fusion of the first and second predictions is determined. The prediction may be determined based on the fusion.

In some embodiments, the fusion of the first and second predictions may be determined by determining an average of the first and second predictions as the fusion. Alternatively, in some embodiments, the fusion of the first and second predictions may be determined by performing a clipping operation on the average of the first and second predictions to obtain a clipped average as the fusion. Alternatively, in some embodiments, the fusion of the first and second predictions may be determined by performing a clipping operation on the first and second predictions and determining an average of the clipped first and second predictions as the fusion.

Alternatively, or in addition, in some embodiments, the first prediction is determined by determining the first prediction of a first sample of the target video block. Likewise, the second prediction is determined by determining the second prediction of a second sample different from the first sample of the target video block. That is, the fusion method may be selecting different samples from different buffers.

In some embodiments, first and second buffers in the buffer set are from a same slice, a same tile, or a same subpicture of the video. Alternatively, in some embodiments, the first and second buffers in the buffer set are from different slices, different tiles, or different subpictures of the video.

In some embodiments, a reconstructed sample of the target video block is stored in a target buffer in the buffer set. In other words, after the reconstruction of a video block, its reconstructed samples may be stored in one buffer of the buffer set. For example, the storing of the reconstructed sample may be before or after a loop filter.

In some embodiments, information regarding a selection of the target buffer from the buffer set may be indicated in the bitstream. Alternatively, in some embodiments, the information regarding the selection of the target buffer may be determined on-the-fly. That is to say, which buffer to store the reconstructed samples may be signaled or derived on-the-fly.

Alternatively, or in addition, in some embodiments, the target buffer from the buffer set is selected based on a buffer index. In other words, which buffer to store the reconstructed samples may be indicated by a buffer index.

In some embodiments, the buffer index is coded using context-based arithmetic coding. For example, a number of binaries of the buffer index may be associated with a number of buffers in the buffer set. If the buffer set comprises two buffers, one binary is indicated as the buffer index. That is, in the embodiment where the buffer set has two buffers, one binary (bin) may be signaled to indicate which buffer is used to store the reconstructed samples of the current video coding unit.

In some embodiments, a first binary of the buffer index has a first context different from a second context of a second binary of the buffer index. That is, each bin of the coded index may have only its own context.

In some embodiments, a context associated with the buffer index comprises information regarding a left neighbor and an above neighbor of the target video block. That is, the context may consider the current video coding unit's left neighbor and above neighbor.

In some embodiments, the buffer index is indicated by a feature of the target video block. For example, the feature may comprise information regarding a number of sub-units or samples using the IBC mode. Alternatively, or in addition, the feature may comprise information regarding a number of sub-units or samples using a palette mode. That is, the feature may include how many sub-units/samples use the IBC mode or how many sub-units/samples use a palette mode.

In some embodiments, a location in the target buffer is determined to store the reconstructed sample based on an offset vector. For example, the offset vector may comprise (block vector x (BVx), block vector y (BVy)). That is, the exact location in the buffer to store the reconstructed samples may be indicated by an offset vector e.g., (BVx, BVy).

In some embodiments, a buffer in the buffer set may be reset to be a certain value. The certain value may comprise a valid pixel value or an invalid pixel value. In some embodiments, the resetting of the buffer is before or after coding the target video block.

In some embodiments, the target video block comprises one of: a picture, a slice, a tile, a coding tree unit (CTU) row, a CTU, a virtual pipeline data unit (VPDU), a coding unit (CU), or a prediction unit (PU).

In some embodiments, the buffer may be reset to be the certain value before coding a picture, a tile or a slice. For example, all buffers in the buffer set may be reset to the certain value or given value before decoding a picture, a tile or a slice. The certain value or given value may be −1.

In some embodiments, a rectangular area in the buffer corresponding to the target video block may be reset to be the certain value after coding the target video block. For example, the target video block may comprise one of: a CTU, a virtual pipeline data unit (VPDU), a coding unit (CU), or a prediction unit (PU). That is, after decoding a video coding unit (for example, a CTU or VPDU or CU or PU), an rectangular area in a buffer corresponding to the current unit may be reset to be the certain value or given value. The certain value or given value may be −1.

In some embodiments, the correspondence between the rectangular area and the target video block depends on a buffer index and a location of the target video block.

In some embodiments, the buffer in the buffer set is reset without resetting a further buffer different from the buffer in the buffer set. In other words, some buffers may be reset to be the certain value while some others may be not.

In some embodiments, information indicating that a combination of a buffer index and an offset vector is valid may be indicated in the bitstream and/or a conformance constraint. In other words, it may be a bitstream and/or conformance constraint that the combination of a buffer index and an offset vector shall be valid.

Alternatively, or in addition, in some embodiments, a validity of the combination of the buffer index and the offset vector may be determined based on whether the prediction formed with the buffer index and the offset vector comprises an invalid pixel value. That is, the validity of the combination of a buffer index and an offset vector may be determined by whether the prediction formed with the buffer index and offset vector contains invalid pixel value or not.

In some embodiments, a bitstream of a video may be stored in a non-transitory computer-readable recording medium. The bitstream of the video can be generated by a method performed by a video processing apparatus. According to the method, a prediction of a target video block of the video may be determined from a buffer set. The target video block is coded with intra block copy (IBC) mode. A bitstream of the video may be generated based on the prediction.

In some embodiments, a prediction of a target video block of the video may be determined from a buffer set. The target video block is coded with intra block copy (IBC) mode. A bitstream of the video may be generated based on the prediction. The bitstream may be stored in a non-transitory computer-readable recording medium.

Implementations of the present disclosure can be described in view of the following clauses, the features of which can be combined in any reasonable manner.

Clause 1. A method for video processing, comprising: determining, during a conversion between a target video block of a video and a bitstream of the video, a prediction of the target video block from a buffer set, the target video block being coded with intra block copy (IBC) mode; and performing the conversion based on the prediction.

Clause 2. The method of clause 1, wherein the buffer set comprises at least two buffers.

Clause 3. The method of clause 1 or clause 2, wherein a first size of a first buffer in the buffer set is same with a second size of a second buffer in the buffer set.

Clause 4. The method of clause 3, wherein the first size comprises a first height and a first width.

Clause 5. The method of clause 3 or clause 4, wherein the first size comprises one of: a size of a coding tree unit (CTU), or a size of a virtual pipeline data unit (VPDU).

Clause 6. The method of clause 1 or clause 2, wherein a first size of a first buffer in the buffer set is different from a second size of a second buffer in the buffer set.

Clause 7. The method of clause 6, wherein at least one of the followings is met: a first height of the first buffer is different from a second height of the second buffer, a first width of the first buffer is different from a second width of the second buffer.

Clause 8. The method of clause 6 or clause 7, wherein the first size comprises a size of a coding tree unit (CTU), and the second size comprises a size of a virtual pipeline data unit (VPDU).

Clause 9. The method of any of clauses 1-8, wherein a first sample in a first buffer in the buffer set is unconnected to a second sample in a video processing unit comprising the target video block.

Clause 10. The method of clause 9, wherein the video processing unit comprises one of the following: a coding tree unit (CTU), a virtual pipeline data unit (VPDU), a coding unit (CU), or a prediction unit (PU).

Clause 11. The method of any of clauses 1-10, wherein a first sample in a first buffer in the buffer set is unconnected to a third sample in a second buffer in the buffer set.

Clause 12. The method of any of clauses 1-11, wherein determining the prediction of the target video block from the buffer set comprises: determining the prediction by using at least one buffer in the buffer set.

Clause 13. The method of clause 12, further comprising: indicating information regarding a selection of the at least one buffer from the buffer set in the bitstream; or determining the information regarding the selection of the at least one buffer from the buffer set on-the-fly.

Clause 14. The method of any of clauses 1-13, wherein determining the prediction of the target video block from the buffer set comprises: determining a first portion of the prediction from a first buffer in the buffer set; determining a second portion of the prediction from a second buffer different from the first buffer in the buffer set; and determining the prediction based on the first and second portions of the prediction.

Clause 15. The method of any of clauses 1-13, wherein determining the prediction of the target video block from the buffer set comprises: determining a first prediction from a first buffer in the buffer set; determining a second prediction from a second buffer different from the first buffer in the buffer set; determining a fusion of the first and second predictions; and determining the prediction based on the fusion.

Clause 16. The method of clause 15, wherein determining the fusion of the first and second predictions comprises one of the following: determining an average of the first and second predictions as the fusion; performing a clipping operation on the average of the first and second predictions to obtain a clipped average as the fusion; or performing a clipping operation on the first and second predictions and determining an average of the clipped first and second predictions as the fusion.

Clause 17. The method of clause 15 or clause 16, wherein: determining the first prediction comprises determining the first prediction of a first sample of the target video block; and determining the second prediction comprises determining the second prediction of a second sample different from the first sample of the target video block.

Clause 18. The method of any of clauses 1-17, wherein first and second buffers in the buffer set are from a same slice, a same tile, or a same subpicture of the video.

Clause 19. The method of any of clauses 1-17, wherein first and second buffers in the buffer set are from different slices, different tiles, or different subpictures of the video.

Clause 20. The method of any of clauses 1-19, further comprising: storing a reconstructed sample of the target video block in a target buffer in the buffer set.

Clause 21. The method of clause 20, wherein the storing of the reconstructed sample is before or after a loop filter.

Clause 22. The method of clause 20 or clause 21, further comprising: indicating information regarding a selection of the target buffer from the buffer set in the bitstream; or determining the information regarding the selection of the target buffer on-the-fly.

Clause 23. The method of any of clauses 20-22, further comprising: selecting the target buffer from the buffer set based on a buffer index.

Clause 24. The method of clause 23, wherein the buffer index is coded using context-based arithmetic coding.

Clause 25. The method of clause 24, wherein a number of binaries of the buffer index is associated with a number of buffers in the buffer set.

Clause 26. The method of clause 24 or clause 25, wherein if the buffer set comprises two buffers, one binary is indicated as the buffer index.

Clause 27. The method of any of clauses 24-26, wherein a first binary of the buffer index has a first context different from a second context of a second binary of the buffer index.

Clause 28. The method of any of clauses 24-27, wherein a context associated with the buffer index comprises information regarding a left neighbor and an above neighbor of the target video block.

Clause 29. The method of clause 23, wherein the buffer index is indicated by a feature of the target video block.

Clause 30. The method of clause 29, wherein the feature comprises at least one of: information regarding a number of sub-units or samples using the IBC mode, or information regarding a number of sub-units or samples using a palette mode.

Clause 31. The method of any of clauses 20-30, further comprising: determining a location in the target buffer to store the reconstructed sample based on an offset vector.

Clause 32. The method of clause 31, wherein the offset vector comprises (block vector x (BVx), block vector y (BVy)).

Clause 33. The method of any of clauses 1-32, further comprising: resetting a buffer in the buffer set to be a certain value.

Clause 34. The method of clause 33, wherein the certain value comprises one of: a valid pixel value, or an invalid pixel value.

Clause 35. The method of clause 33 or clause 34, wherein the resetting of the buffer is before or after coding the target video block.

Clause 36. The method of any of clauses 1-35, wherein the target video block comprises one of: a picture, a slice, a tile, a coding tree unit (CTU) row, a CTU, a virtual pipeline data unit (VPDU), a coding unit (CU), or a prediction unit (PU).

Clause 37. The method of clause 33, wherein resetting the buffer comprises: resetting the buffer to be the certain value before coding a picture, a tile or a slice.

Clause 38. The method of clause 33, wherein resetting the buffer comprises: resetting a rectangular area in the buffer corresponding to the target video block to be the certain value after coding the target video block.

Clause 39. The method of clause 37 or clause 38, wherein the certain value is −1.

Clause 40. The method of clause 38, wherein the correspondence between the rectangular area and the target video block depends on a buffer index and a location of the target video block.

Clause 41. The method of clause 38, wherein the target video block comprises one of: a CTU, a virtual pipeline data unit (VPDU), a coding unit (CU), or a prediction unit (PU).

Clause 42. The method of any of clauses 33-41, wherein resetting the buffer in the buffer set comprises: resetting the buffer in the buffer set without resetting a further buffer different from the buffer in the buffer set.

Clause 43. The method of any of clauses 1-42, further comprising: including information indicating that a combination of a buffer index and an offset vector is valid in at least one of: the bitstream, or a conformance constraint.

Clause 44. The method of clause 43, further comprising: determining a validity of the combination of the buffer index and the offset vector based on whether the prediction formed with the buffer index and the offset vector comprises an invalid pixel value.

Clause 45. The method of any of clauses 1-44, wherein in the IBC mode, prediction samples are derived from blocks of sample values of a same video region as determined by block vectors.

Clause 46. The method of any of clauses 1-45, wherein the conversion includes encoding the target video block into the bitstream.

Clause 47. The method of any of clauses 1-45, wherein the conversion includes decoding the target video block from the bitstream.

Clause 48. An apparatus for processing video data comprising a processor and a non-transitory memory with instructions thereon, wherein the instructions upon execution by the processor, cause the processor to perform a method in accordance with any of Clauses 1-47.

Clause 49. A non-transitory computer-readable storage medium storing instructions that cause a processor to perform a method in accordance with any of Clauses 1-47.

Clause 50. A non-transitory computer-readable recording medium storing a bitstream of a video which is generated by a method performed by a video processing apparatus, wherein the method comprises: determining a prediction of a target video block of the video from a buffer set, the target video block being coded with intra block copy (IBC) mode; and generating the bitstream based on the prediction.

Clause 51. A method for storing a bitstream of a video, comprising: determining a prediction of a target video block of the video from a buffer set, the target video block being coded with intra block copy (IBC) mode; generating the bitstream based on the prediction; and storing the bitstream in a non-transitory computer-readable recording medium.

Example Device

Figure 5:
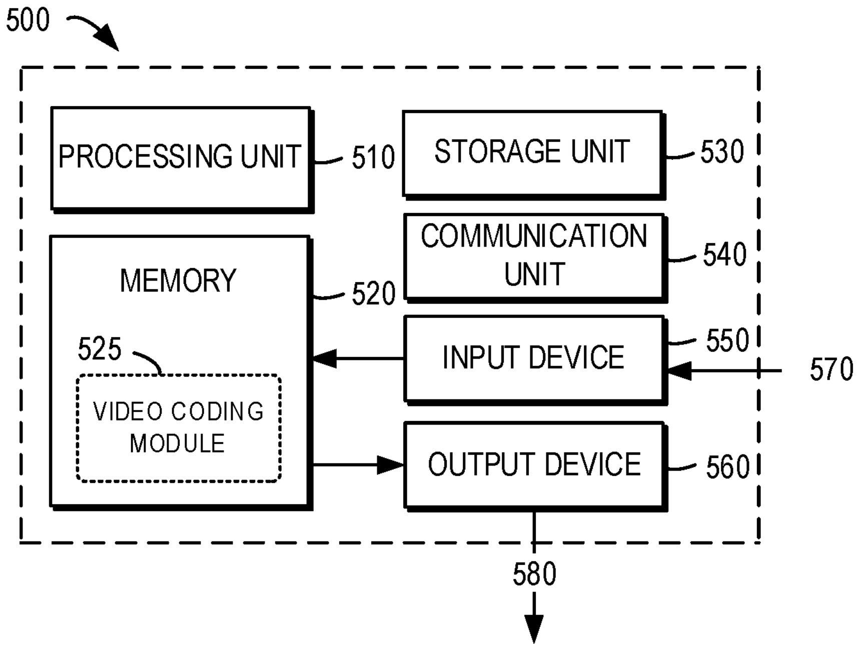
FIG. 5 illustrates a block diagram of a computing device in which various embodiments of the present disclosure can be implemented.

FIG. 5 illustrates a block diagram of a computing device 500 in which various embodiments of the present disclosure can be implemented. The computing device 500 may be implemented as or included in the source device 110 (or the video encoder 114 or 200) or the destination device 120 (or the video decoder 124 or 300).

It would be appreciated that the computing device 500 shown in FIG. 5 is merely for purpose of illustration, without suggesting any limitation to the functions and scopes of the embodiments of the present disclosure in any manner.

As shown in FIG. 5, the computing device 500 includes a general-purpose computing device 500. The computing device 500 may at least comprise one or more processors or processing units 510, a memory 520, a storage unit 530, one or more communication units 540, one or more input devices 550, and one or more output devices 560.

In some embodiments, the computing device 500 may be implemented as any user terminal or server terminal having the computing capability. The server terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, television receiver, radio broadcast receiver, E-book device, gaming device, or any combination thereof, including the accessories and peripherals of these devices, or any combination thereof. It would be contemplated that the computing device 500 can support any type of interface to a user (such as "wearable" circuitry and the like).

The processing unit 510 may be a physical or virtual processor and can implement various processes based on programs stored in the memory 520. In a multi-processor system, multiple processing units execute computer executable instructions in parallel so as to improve the parallel processing capability of the computing device 500. The processing unit 510 may also be referred to as a central processing unit (CPU), a microprocessor, a controller or a microcontroller.

The computing device 500 typically includes various computer storage medium. Such medium can be any medium accessible by the computing device 500, including, but not limited to, volatile and non-volatile medium, or detachable and non-detachable medium. The memory 520 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 530 may be any detachable or non-detachable medium and may include a machine-readable medium such as a memory, flash memory drive, magnetic disk or another other media, which can be used for storing information and/or data and can be accessed in the computing device 500.

The computing device 500 may further include additional detachable/non-detachable, volatile/non-volatile memory medium. Although not shown in FIG. 5, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 540 communicates with a further computing device via the communication medium. In addition, the functions of the components in the computing device 500 can be implemented by a single computing cluster or multiple computing machines that can communicate via communication connections. Therefore, the computing device 500 can operate in a networked environment using a logical connection with one or more other servers, networked personal computers (PCs) or further general network nodes.

The input device 550 may be one or more of a variety of input devices, such as a mouse, keyboard, tracking ball, voice-input device, and the like. The output device 560 may be one or more of a variety of output devices, such as a display, loudspeaker, printer, and the like. By means of the communication unit 540, the computing device 500 can further communicate with one or more external devices (not shown) such as the storage devices and display device, with one or more devices enabling the user to interact with the computing device 500, or any devices (such as a network card, a modem and the like) enabling the computing device 500 to communicate with one or more other computing devices, if required. Such communication can be performed via input/output (I/O) interfaces (not shown).

In some embodiments, instead of being integrated in a single device, some or all components of the computing device 500 may also be arranged in cloud computing architecture. In the cloud computing architecture, the components may be provided remotely and work together to implement the functionalities described in the present disclosure. In some embodiments, cloud computing provides computing, software, data access and storage service, which will not require end users to be aware of the physical locations or configurations of the systems or hardware providing these services. In various embodiments, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The computing device 500 may be used to implement video encoding/decoding in embodiments of the present disclosure. The memory 520 may include one or more video coding modules 525 having one or more program instructions. These modules are accessible and executable by the processing unit 510 to perform the functionalities of the various embodiments described herein.

In the example embodiments of performing video encoding, the input device 550 may receive video data as an input 570 to be encoded. The video data may be processed, for example, by the video coding module 525, to generate an encoded bitstream. The encoded bitstream may be provided via the output device 560 as an output 580.

In the example embodiments of performing video decoding, the input device 550 may receive an encoded bitstream as the input 570. The encoded bitstream may be processed, for example, by the video coding module 525, to generate decoded video data. The decoded video data may be provided via the output device 560 as the output 580.

While this disclosure has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting.

We claim:

1. A method for video processing, comprising:

determining, during a conversion between a target video block of a video and a bitstream of the video, a prediction of the target video block from a buffer set, the target video block being coded with intra block copy (IBC) mode, wherein the buffer set comprises at least two buffers, wherein a first size of a first buffer in the buffer set comprises one of: a size of a coding tree unit (CTU), or a size of a virtual pipeline data unit (VPDU);

performing the conversion based on the prediction;

storing a reconstructed sample of the target video block in a target buffer in the buffer set; and determining a location in the target buffer to store the reconstructed sample based on an offset vector, wherein the offset vector comprises (block vector x (BVx), block vector y (BVy)), wherein the storing of the reconstructed sample is before or after a loop filter, and/or wherein the method further comprises:

indicating information regarding a selection of the target buffer from the buffer set in the bitstream; or determining the information regarding the selection of the target buffer on-the-fly.

2. The method of claim 1, wherein the first size of the first buffer in the buffer set is same with a second size of a second buffer in the buffer set.

3. The method of claim 1, wherein the first size of the first buffer in the buffer set is different from a second size of a second buffer in the buffer set, wherein at least one of the followings is met: a first height of the first buffer is different from a second height of the second buffer, or a first width of the first buffer is different from a second width of the second buffer, or wherein the first size comprises the size of CTU, and the second size comprises the size of VPDU.

4. The method of claim 1, wherein a first sample in a buffer in the buffer set is unconnected to a second sample in a video processing unit comprising the target video block, wherein the video processing unit comprises one of the following: a coding tree unit (CTU), a virtual pipeline data unit (VPDU), a coding unit (CU), or a prediction unit (PU).

5. The method of claim 1, wherein a first sample in a buffer in the buffer set is unconnected to a third sample in a further buffer in the buffer set.

6. The method of claim 1, wherein determining the prediction of the target video block from the buffer set comprises: determining the prediction by using at least one buffer in the buffer set, and wherein the method further comprises:

indicating information regarding a selection of the at least one buffer from the buffer set in the bitstream; or determining the information regarding the selection of the at least one buffer from the buffer set on-the-fly.

7. The method of claim 1, wherein determining the prediction of the target video block from the buffer set comprises:

determining a first portion of the prediction from the first buffer in the buffer set;

determining a second portion of the prediction from the second buffer different from the first buffer in the buffer set; and determining the prediction based on the first and second portions of the prediction.

8. The method of claim 1, wherein determining the prediction of the target video block from the buffer set comprises:

determining a first prediction from the first buffer in the buffer set;

determining a second prediction from the second buffer different from the first buffer in the buffer set;

determining a fusion of the first and second predictions; and determining the prediction based on the fusion.

9. The method of claim 8, wherein determining the fusion of the first and second predictions comprises one of:

determining an average of the first and second predictions as the fusion;

performing a clipping operation on the average of the first and second predictions to obtain a clipped average as the fusion; or performing a clipping operation on the first and second predictions and determining an average of the clipped first and second predictions as the fusion, wherein determining the first prediction comprises determining the first prediction of a first sample of the target video block; and wherein determining the second prediction comprises determining the second prediction of a second sample different from the first sample of the target video block.

10. The method of claim 1, wherein the first and second buffers in the buffer set are from a same slice, a same tile, or a same subpicture of the video, or wherein the first and second buffers in the buffer set are from different slices, different tiles, or different subpictures of the video.

11. The method of claim 1, further comprising: selecting the target buffer from the buffer set based on a buffer index, wherein the buffer index is coded using context-based arithmetic coding, wherein a number of binaries of the buffer index is associated with a number of buffers in the buffer set, wherein if the buffer set comprises two buffers, one binary is indicated as the buffer index, wherein a first binary of the buffer index has a first context different from a second context of a second binary of the buffer index, or wherein a context associated with the buffer index comprises information regarding a left neighbor and an above neighbor of the target video block.

12. The method of claim 1, further comprising: selecting the target buffer from the buffer set based on a buffer index, wherein the buffer index is indicated by a feature of the target video block, and wherein the feature comprises at least one of:

information regarding a number of sub-units or samples using the IBC mode, or information regarding a number of sub-units or samples using a palette mode.

13. The method of claim 1, further comprising: resetting a buffer in the buffer set to be a certain value, wherein the certain value comprises one of: a valid pixel value, or an invalid pixel value, wherein the resetting of the buffer is before or after coding the target video block, wherein resetting the buffer comprises: resetting the buffer to be the certain value before coding a picture, a tile or a slice, or wherein resetting the buffer comprises: resetting a rectangular area in the buffer corresponding to the target video block to be the certain value after coding the target video block, or wherein resetting the buffer in the buffer set comprises: resetting the buffer in the buffer set without resetting a further buffer different from the buffer in the buffer set, wherein the correspondence between the rectangular area and the target video block depends on a buffer index and a location of the target video block, wherein the target video block comprises one of: a CTU, a virtual pipeline data unit (VPDU), a coding unit (CU), or a prediction unit (PU).

14. The method of claim 1, further comprising:

including information indicating that a combination of a buffer index and an offset vector is valid in at least one of: the bitstream, or a conformance constraint; and determining a validity of the combination of the buffer index and the offset vector based on whether the prediction formed with the buffer index and the offset vector comprises an invalid pixel value, wherein in the IBC mode, prediction samples are derived from blocks of sample values of a same video region as determined by block vectors, wherein the target video block comprises one of: a picture, a slice, a tile, a coding tree unit (CTU) row, a CTU, a virtual pipeline data unit (VPDU), a coding unit (CU), or a prediction unit (PU).

15. The method of claim 1, wherein the conversion includes encoding the target video block into the bitstream.

16. The method of claim 1, wherein the conversion includes decoding the target video block from the bitstream.

17. An apparatus for processing video data comprising a processor and a non-transitory memory with instructions thereon, wherein the instructions upon execution by the processor, cause the processor to:

determine, during a conversion between a target video block of a video and a bitstream of the video, a prediction of the target video block from a buffer set, the target video block being coded with intra block copy (IBC) mode, wherein the buffer set comprises at least two buffers, wherein a first size of a first buffer in the buffer set comprises one of: a size of a coding tree unit (CTU), or a size of a virtual pipeline data unit (VPDU);

perform the conversion based on the prediction, store a reconstructed sample of the target video block in a target buffer in the buffer set; and determine a location in the target buffer to store the reconstructed sample based on an offset vector, wherein the offset vector comprises (block vector x (BVx), block vector y (BVy)), wherein the storing of the reconstructed sample is before or after a loop filter, and/or wherein the processor is further caused to:

indicate information regarding a selection of the target buffer from the buffer set in the bitstream; or determine the information regarding the selection of the target buffer on-the-fly.

18. A non-transitory computer-readable storage medium storing instructions that cause a processor to perform a method performed by a video processing apparatus, wherein the method comprises:

determining, during a conversion between a target video block of a video and a bitstream of the video, a prediction of the target video block from a buffer set, the target video block being coded with intra block copy (IBC) mode, wherein the buffer set comprises at least two buffers, wherein a first size of a first buffer in the buffer set comprises one of: a size of a coding tree unit (CTU), or a size of a virtual pipeline data unit (VPDU);

performing the conversion based on the prediction, storing a reconstructed sample of the target video block in a target buffer in the buffer set; and determining a location in the target buffer to store the reconstructed sample based on an offset vector, wherein the offset vector comprises (block vector x (BVx), block vector y (BVy)), wherein the storing of the reconstructed sample is before or after a loop filter, and/or wherein the method further comprises:

indicating information regarding a selection of the target buffer from the buffer set in the bitstream; or determining the information regarding the selection of the target buffer on-the-fly.

19. A method for storing a bitstream of a video, comprising:

determining a prediction of a target video block of the video from a buffer set, the target video block being coded with intra block copy (IBC) mode, wherein the buffer set comprises at least two buffers, wherein a first size of a first buffer in the buffer set comprises one of:

a size of a coding tree unit (CTU), or a size of a virtual pipeline data unit (VPDU);

generating the bitstream based on the prediction;

storing a bitstream in a non-transitory computer-readable recording medium storing a reconstructed sample of the target video block in a target buffer in the buffer set; and determining a location in the target buffer to store the reconstructed sample based on an offset vector, wherein the offset vector comprises (block vector x (BVx), block vector y (BVy));

wherein the storing of the reconstructed sample is before or after a loop filter, and/or wherein the method further comprises:

indicating information regarding a selection of the target buffer from the buffer set in the bitstream; or determining the information regarding the selection of the target buffer on-the-fly.

* * * * *